United States Patent [19]
Taub et al.
[11] Patent Number: 4,794,411
[45] Date of Patent: Dec. 27, 1988

[54] THERMAL INK-JET HEAD STRUCTURE WITH ORIFICE OFFSET FROM RESISTOR

[75] Inventors: Howard H Taub, San Jose, Calif.; Gordon D. Denler, Monmouth, Oreg.

[73] Assignee: Hewlett-Packard Company, Palo Alto, Calif.

[21] Appl. No.: 109,685

[22] Filed: Oct. 19, 1987

[51] Int. Cl.[4] .......... G01D 15/18
[52] U.S. Cl. .......... 346/140 R; 346/1.1
[58] Field of Search .......... 346/140, 1.1

[56] References Cited

U.S. PATENT DOCUMENTS 4,330,787 5/1982 Sato .......... 346/140
4,490,728 12/1984 Vaught .......... 346/140 X
4,587,534 5/1986 Saito .......... 346/140

*Primary Examiner*—Joseph W. Hartary
*Attorney, Agent, or Firm*—William J. Bethurum

[57] ABSTRACT

Off-setting the orifice (20) from the resistor (10) in a thermal ink-jet printhead provides improved print quality by controlling misdirection of first drops (26), second and subsequent drops (28) in multidrop printing, and for satellite drop control.

6 Claims, 4 Drawing Sheets

THERMAL INK-JET HEAD STRUCTURE WITH ORIFICE OFFSET FROM RESISTOR

TECHNICAL FIELD

The present invention relates to thermal ink-jet printers, and, more particularly, to apparatus for improving the quality of printing from a thermal ink-jet printhead.

BACKGROUND ART

Spray resulting from misdirected drops is frequently observed for thermal ink-jet heads. The problem is considerably worse for printing in the "multidrop" mode, that is, printing groups of drops in bursts at 50 kHz drop rates.

Experiments have shown that alignment between the resistor and orifice in the thermal head is a critical factor influencing the direction of exiting drops. For heads employing the three-sided barrier structure, perfect alignment of the orifice over the resistor has been found not to be the ideal condition.

U.S. Pat. No. 4,330,787 describes a thermal ink-jet printer in which the angle between the normals to the plane of the resistor and the plane of the orifice are between 0° and 90°. However, changing the angle between the resistor and orifice still does not provide the printing quality required.

DISCLOSURE OF INVENTION

In accordance with the invention, an appropriate off-set between the resistor and orifice of a thermal ink-jet printhead significantly improves drop directionality. Such improvement in drop directionality yields improved print quality. The extent of off-set depends on resistor and orifice sizes, as well as on other details of the head architecture. The off-set is an amount sufficient to maintain droplets of ink ejected from the orifice by a trajectory of less than about 0.5° from the normal to the orifice plate. To a first approximation, the center of the orifice is offset from the center of the resistor by about 1 to 25 μm.

BEST MODES FOR CARRYING OUT THE INVENTION

Figure 1:
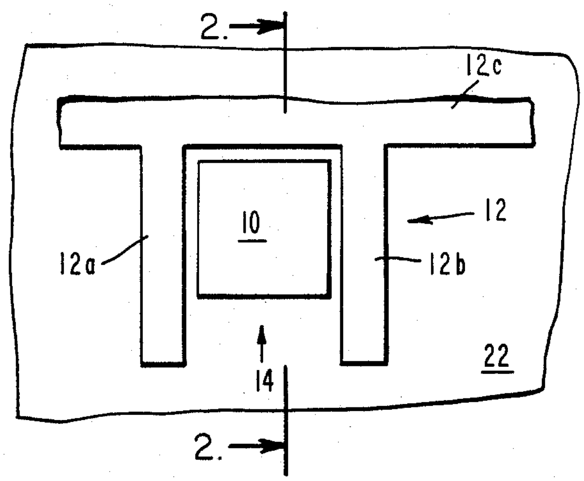
Fig. 1. (PRIOR ART)
FIG. 1 is a top plan view, depicting a resistor associated with a three-sided barrier structure.

Referring now to the drawings wherein like numerals or reference designate like elements throughout, a resistor 10 is encompassed on three sides by a three-wall barrier structure 12, having side barriers **12*a,b* and rear barrier 12*c***. As is common, the resistor has square dimensions.

Figure 2:
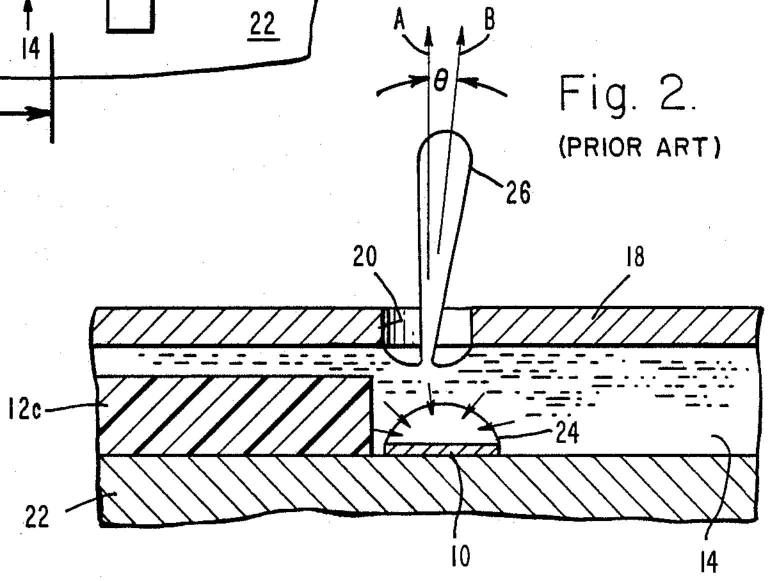
Fig. 2. (PRIOR ART)
FIG. 2 is a cross-sectional view taken along the line 2—2 of FIG. 1, of an aligned resistor/orifice, illustrating misaligned firing of a drop of ink.

Ink from a reservoir (not shown) enters from the fourth side, as indicated by arrow 14. An orifice plate 18, shown in FIG. 2, is provided with an orifice 20. The orifice 20 is positioned over the resistor 10. A substrate 22 supports the resistor 10 and the barrier structure 12.

In operation, ink flows into the assembly 10 from the side opposite the rear barrier **12*c* from the ink reservoir. Upon appropriate application of a current to the resistor 10 from a voltage source (not shown) controlled by a microprocessor (not shown), the resistor emits a sufficient amount of heat to vaporize a thin layer of the ink, thereby forming a bubble 24. The rapid expansion of the bubble 24 causes a droplet 26 of ink to be propelled out through the orifice 20** toward a suitable printing medium, such as paper, transparency, and the like.

Use of centered alignment of the orifice 20 over the resistor 10 causes misalignment of the trajectory (arrow B) of the droplet 26 with respect to the normal to the orifice plate 18 (arrow A). FIG. 2 is a line drawing of a photomicrograph, showing the shape of the droplet 25 and its misaligned trajectory. The ink is ejected at an angle $\theta$ with respect to the normal.

Figure 3:
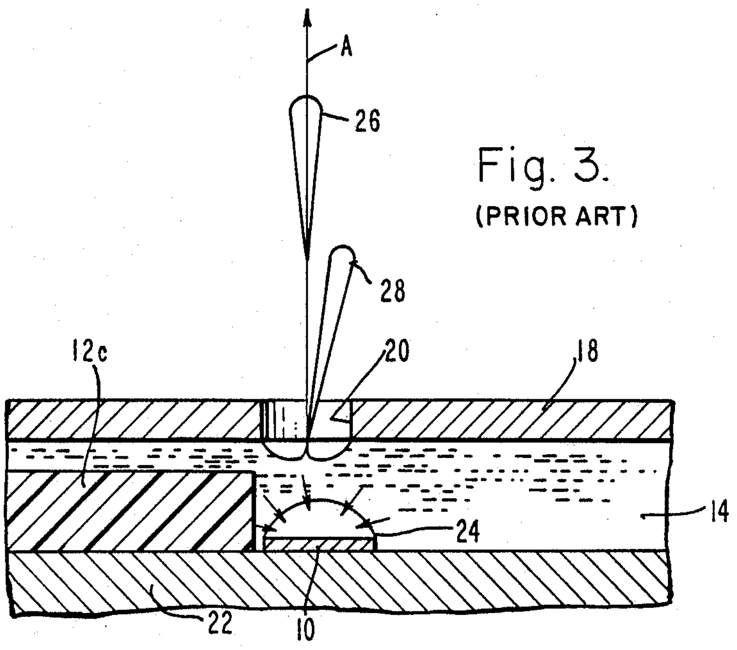
Fig. 3. (PRIOR ART)
FIG. 3 is a view similar to that of FIG. 2, illustrating an example of multidrop operation, with the trajectory of a second drop unacceptably different from the first drop as a consequence of employing an aligned resistor-/orifice.

In the multidrop mode, spray results from misdirected drops. To illustrate, FIG. 3 is a line drawing of a photomicrograph, depicting an example of multidrop operation at 50 kHz, where the trajectory of a second drop 28 is unacceptably different from that of the first drop 26. A significant angle of the second drop 28 relative to the orifice normal (A) as seen in the drawing is observed even when the orifice 20 is perfectly aligned with the resistor 10.

It appears from studies that the firing angle must be less than about 0.5° of the normal to the orifice plate 18 in order to have acceptable print quality. Thus, it is critical that the first drop, subsequent drops and any satellite drops be as close to the normal as possible. Centered alignment results in firing angles considerably greater than about 0.5° and hence are not useful either for single drops or for multiple drops at firing frequencies of 50 kHz and above, with up to about 10 drops per firing burst.

Figure 4:
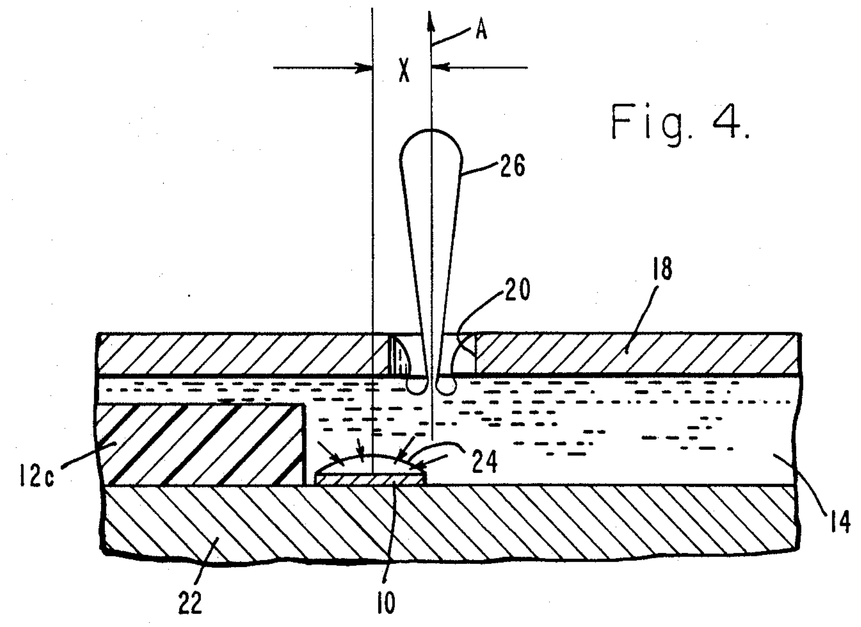
FIG. 4 is a view similar to that of FIG. 2, but using a misaligned, or offset, resistor/orifice in accordance with the invention, illustrating proper firing of a drop of ink.

In accordance with the invention, the orifice 20 is deliberately misaligned with respect to the resistor 10. Such an off-set assembly is depicted in FIG. 4, with the orifice 20 offset in the direction away from the rear barrier **12*c* by an amount designated X. Such offset provides a trajectory of the drop 26** substantially along the normal A.

Figure 5:
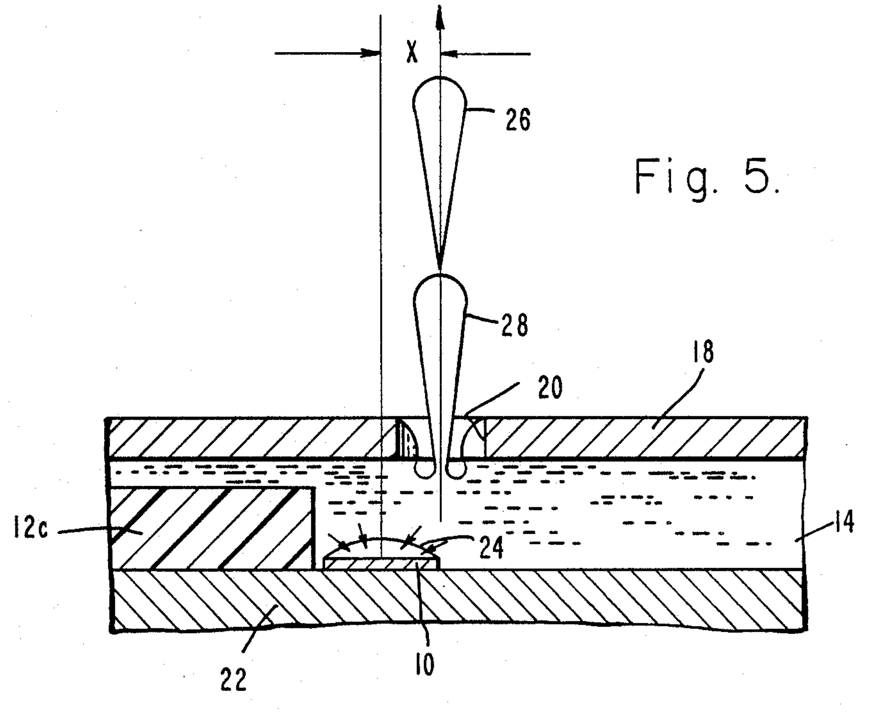
FIG. 5 is a view similar to that of FIG. 4, illustrating an example of multidrop operation, with the trajectory of the second drop substantially the same as that of the first drop.

FIG. 5 depicts an example of multidrop operation at 50 kHz, showing that the trajectory of the second drop 28 is very close to that of the first drop 26 as a consequence of employing deliberate misalignment of the resistor 10 and orifice 20.

Figure 6:
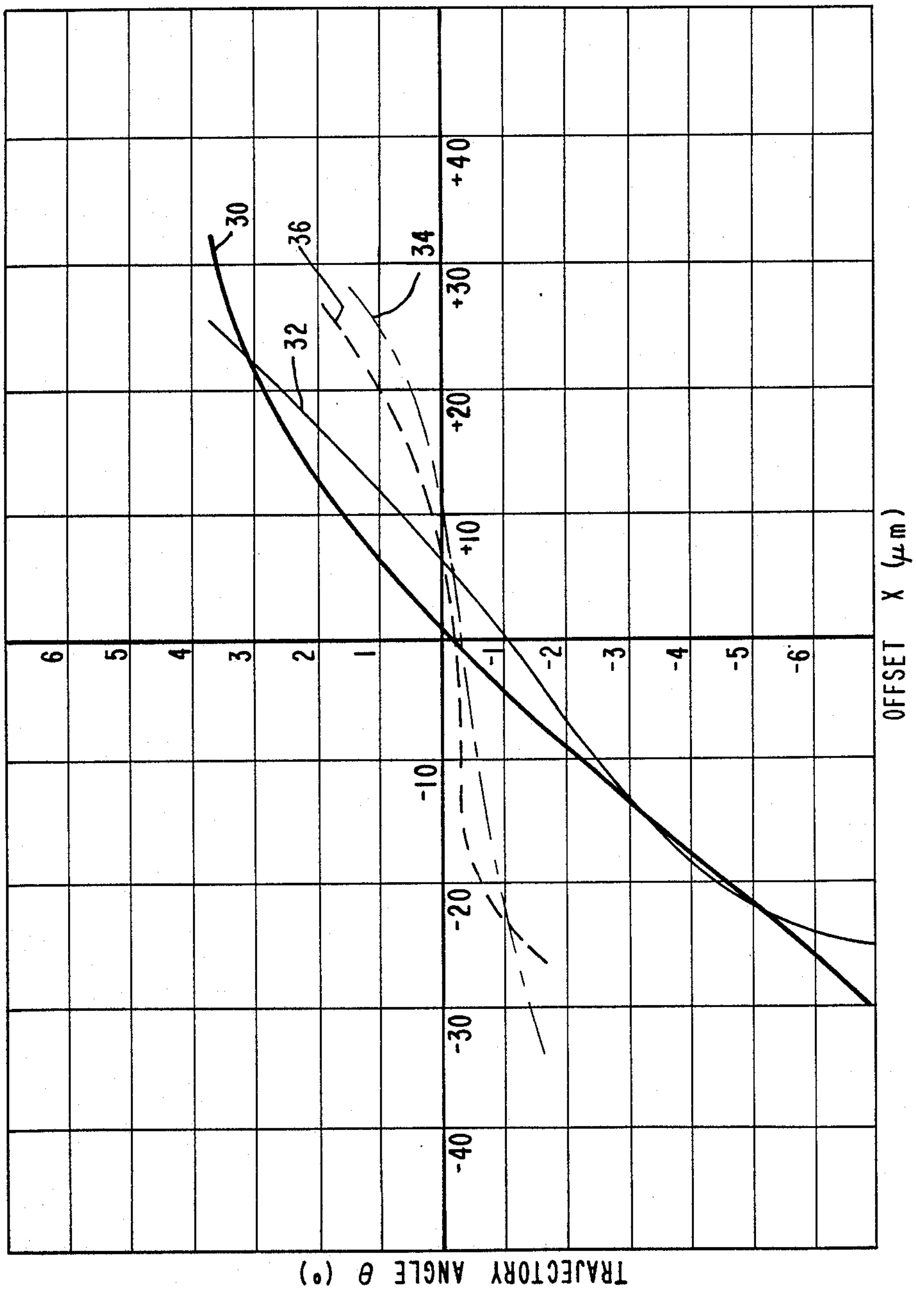
FIG. 6 is a plot on coordinate axes of trajectory angle (in degrees) as a function of orifice-to-resistor off-set (in μm) for several conditions of resistor/orifice aspect ratios, showing data for the ejection of the first drop through the orifice.

FIG. 6 shows measurements of angular misdirection as a function of resistor/orifice offset for the first drop 26 ejected from a thermal ink-jet head with resistors 10 of various sizes and converging orifices 20 with various exit diameters. The measurement drop rate was below 1 kHz. In particular, the following curves reflect measurements for the below-listed resistor sizes and orifice openings:

| Curve | Resistor Size, μm | Bore, μm |
|---|---|---|
| 30 | 60 × 60 | 65 |
| 32 | 50 × 50 | 65 |
| 34 | 65 × 65 | 45 |
| 36 | 50 × 50 | 45 |

It is clear that for the three-wall geometry, the orifice 20 should be offset at least about 1 μm further away from the third barrier 12*c* than the center of the resistor 10. The range of misalignment (X) is about 1 to 25 μm, preferably about 1 to 20 μm and most preferably about 2 to 10 μm.

In FIG. 6, there is a dependence of trajectory error on offset for the first drop ejected. The curves do not go through the origin; therefore, at perfect alignment, there is a trajectory error. This error can be corrected with an offset, in accordance with the invention. For one set of head parameters, for a resistor measuring 50 μm×50 μm and an orifice measuring 65 μm (Curve 32), that trajectory from the normal is as much as 1°.

Figure 7:
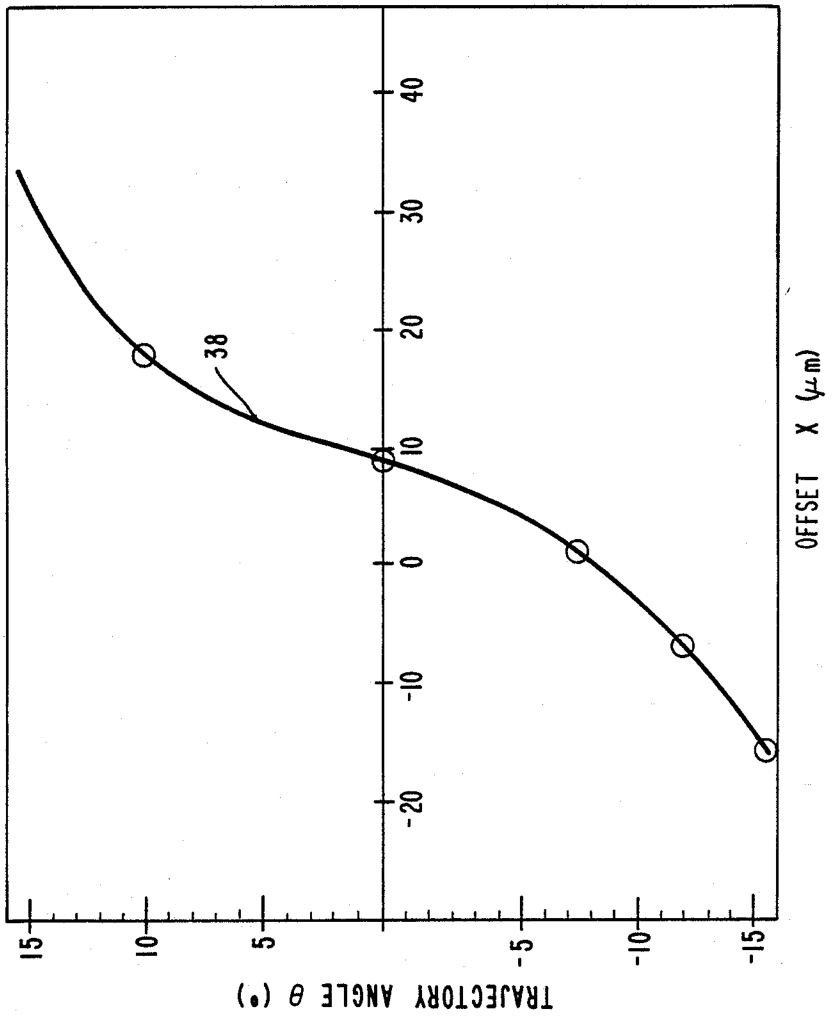
FIG. 7 is a plot on coordinate axes of trajectory angle (in degrees) as a function of orifice-to-resistor off-set between the resistor and the orifice (in μm), showing data for the ejection of the second drop through the orifice.

FIG. 7 shows a measurement of an angular misdirection as a function of resistor/orifice off-set for the second drop 26 ejected from the ink-jet head with 63 μm×63 μm resistors 10 and converging orifices 20 with an exit diameter of 50 μm (Curve 38). The measurement drop rate was 50 kHz. It is clear that for this geometry, the misalignment for the first drop benefits the trajectory of the second drop.

In FIG. 7, for the second drop, the trajectories are at larger angles. For the case shown, perfect alignment would yield a trajectory from the normal of about 8°. However, at an offset of 9 μm, the second drop follows the first.

It appears that the detailed break-off of the tail of ejected drops is related to the resistor/orifice alignment. For a properly "aligned" resistor/orifice (i.e., "properly off-set"), the tail wil break-off at the center of the orifice, which will result in minimum spray due to misdirected satellite droplets.

The orifice/resistor off-set disclosed herein appears to be critical in achieving the highest quality printing. Such off-set may range from 1 to about 25 μm to control misdirection of first drops, second and subsequent drops in multidrop printing, and for satellite drop control.

INDUSTRIAL APPLICABILITY

Orifice/resistor off-set is expected to be used in constructing thermal ink-jet printheads for ink-jet printers.

Thus, orifice/resistor off-set in thermal ink-jet printheads provides improved print quality. Many modifications and changes of an obvious nature may be made without departing from the spirit and scope of the invention, and all such modifications and changes are considered to fall within the scope of the invention, as defined by the appended claims.

What is claimed is:

1. A thermal ink-jet printhead for ink-jet printing onto a print medium including a controlled resistor (10) supported on a substrate (22) in cooperative association with an orifice (20) in an orifice plate (18) maintained substantially parallel above said resistor, said resistor provided on three sides with a barrier structure (12*a*–*c*) and open on a fourth side to a reservoir of ink (14), wherein the center-line of said orifice is off-set from the center-line of said resistor along said fourth side by an amount ranging from about 1 to 25 μm to maintain droplets (26, 28) of ink ejected therefrom by a trajectory less than about 0.5° from the normal to said orifice plate.

2. The printhead of claim 1 wherein said amount of off-set ranges from about 1 μm to 20 μm.

3. The printhead of claim 2 wherein said amount of off-set ranges from about 2 to 10 μm.

4. A method for maintaining the trajectory of a second drop ejected from a resistor/orifice combination in a thermal ink-jet printhead less than about 0.5;

providing said resistor on three sides with a barrier structure and open on a fourth side to an ink reservoir;

off-setting the center-line of said orifice along said forth side with respect to the center-line of said resistor by an amount ranging from about 1 to 25 μm;

ejecting first and second drops through said orifice whereby the trajectory of said second drop is less than about 0.5 from the normal to said orifice.

5. The method of claim 4 wherein said off-setting ranges from about 1 μm to 20 μm.

6. The method of claim 5 wherein said off-setting ranges from about 2 to 10 μm.

* * * * *